United States Patent
Peng et al.

(10) Patent No.: US 9,651,696 B2
(45) Date of Patent: May 16, 2017

(54) SHEAR NOISE ATTENUATION AND DATA MATCHING FOR OCEAN BOTTOM NODE DATA USING COMPLEX WAVELET TRANSFORMS

(71) Applicant: CGGVERITAS SERVICES SA, Massy (FR)

(72) Inventors: Can Peng, Houston, TX (US); Rongxin Huang, Katy, TX (US); Biniam Asmerom, Houston, TX (US)

(73) Assignee: CGG SERVICES SAS, Massy (FR)

( * ) Notice: Subject to any disclaimer, the term of this patent is extended or adjusted under 35 U.S.C. 154(b) by 1014 days.

(21) Appl. No.: 13/894,643

(22) Filed: May 15, 2013

(65) Prior Publication Data

US 2014/0200818 A1 Jul. 17, 2014

Related U.S. Application Data

(60) Provisional application No. 61/751,565, filed on Jan. 11, 2013.

(51) Int. Cl.
*G01V 1/36* (2006.01)
*G01V 1/28* (2006.01)

(52) U.S. Cl.
CPC .............. *G01V 1/364* (2013.01); *G01V 1/28* (2013.01)

(58) Field of Classification Search
CPC .................................. G01V 1/364; G01V 1/28
See application file for complete search history.

(56) References Cited

U.S. PATENT DOCUMENTS

2008/0221801 A1* 9/2008 Craft .................... G01V 1/364
702/17
2011/0213556 A1 9/2011 Yu et al.

OTHER PUBLICATIONS

David B. H. Tay et al., "Flexible Design of Multidimensional Perfect Reconstruction FIR 2-Ban Filters Using Transformations of Variables", IEEE Transactions on Image Processing, vol. 2, No. 4, Oct. 1993.
Hoffe et al., "Applications of OBC Recording", The Leading Edge, Apr. 2000, vol. 19, pp. 382-391.
Paffenholz et al., "Shear Wave Noise on OBS Vz Data—Part II Elastic Modeling of Scatterers in the Seabed", EAGE 68th Conference & Exhibition—Vienna, Austria, Jun. 12-15, 2006, B047.
Selesnick et al., "The Dual-Tree Complex Wavelet Transform", IEEE Signal Processing Magazine, Nov. 2005, vol. 22, pp. 123-151.
Yu et al., "Ocean Bottom Seismic Noise Attenuation Using Local Attribute Matching Filter", SEG Technical Program Expanded Abstracts, vol. 30, San Antonio 2011 Annual Meeting, pp. 3586-3590.
Chakraborty et al., "Frequency-time decomposition of seismic data using wavelet-based methods," Geophysics, Nov.-Dec. 1995, pp. 1906-1916, vol. 60, No. 6.

(Continued)

*Primary Examiner* — Regis Betsch
(74) *Attorney, Agent, or Firm* — Patent Portfolio Builders PLLC

(57) ABSTRACT

Methods and systems for shear noise attenuation based on matching vertical particle velocity data and pressure data are described. The shear noise attenuation is based on the fact that different stages of the analysis can be performed with different numbers of wavelet orientations. The analysis is performed for frequency sub-bands for all wave numbers and vice versa.

20 Claims, 11 Drawing Sheets

(56) References Cited

OTHER PUBLICATIONS

Extended European Search Report mailed Apr. 4, 2017 in related EP Application No. 14150663.4 (references Yu et al., "Ocean Bottom Seismic Noise . . . " and Selesnick et al., "The Duel-tree Complex . . . " previously cited in IDS filed on May 15, 2013).
Goudarzi et al., "Seismic coherent and random noise attenuation using the undecimated discrete wavelet transform method with WDGA technique," Journal of Geophysics and Engineering, Dec. 2012, vol. 9, No. 6, pp. 619-631.
Yu et al., "Seismic Noise Attenuation Using 2D Complex Wavelet Transform," 70th EAGE Conference & Exhibition, Jun. 9-12, 2008, Rome, IT.

* cited by examiner

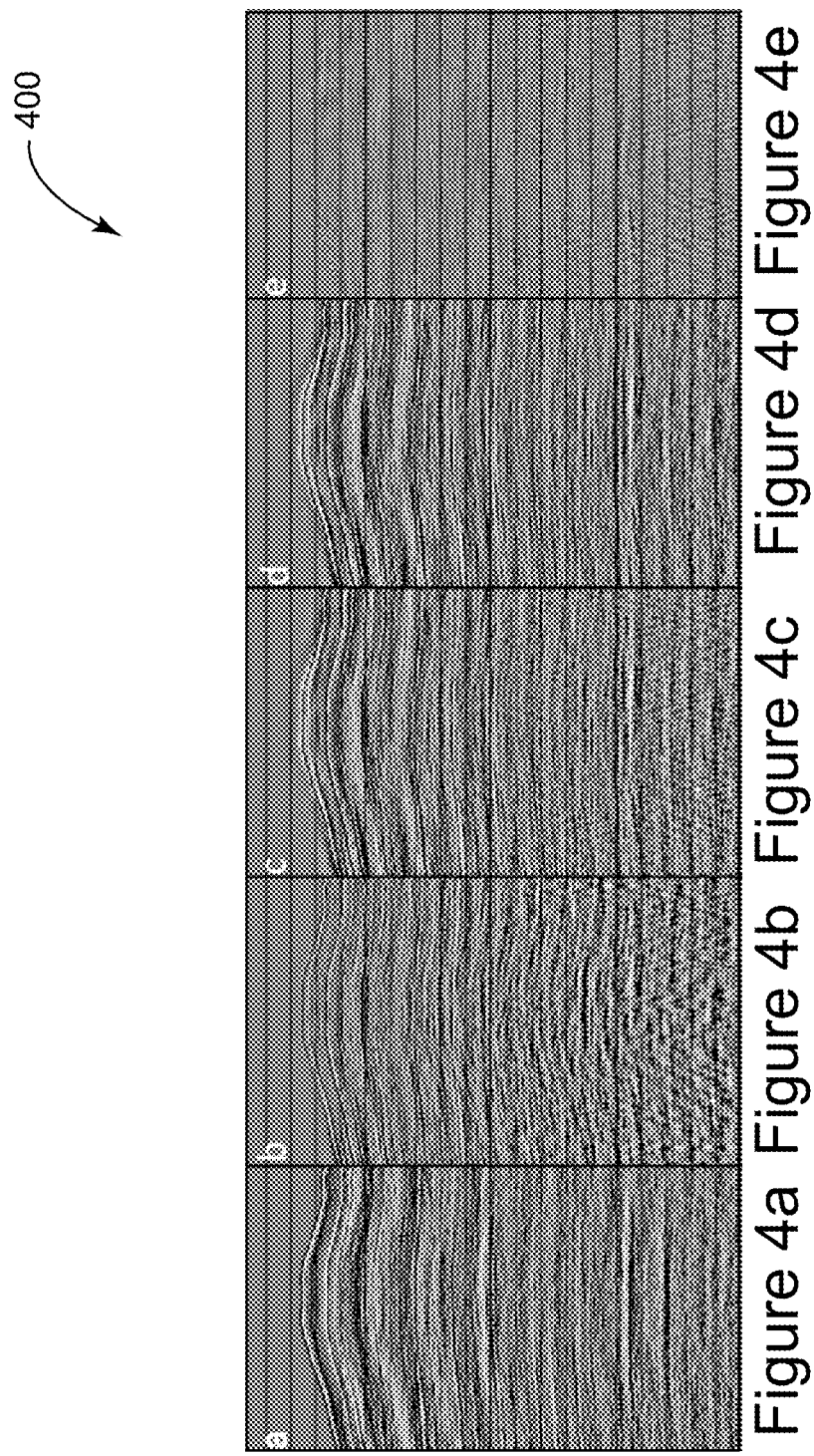

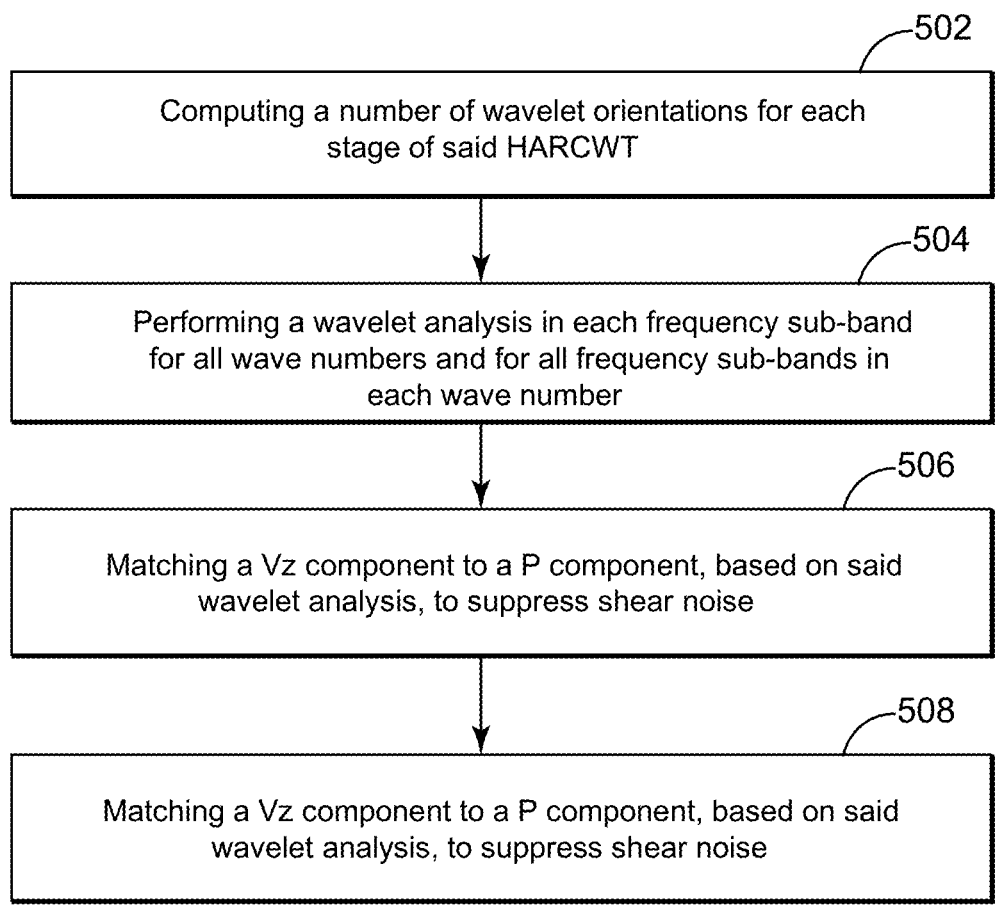

SHEAR NOISE ATTENUATION AND DATA MATCHING FOR OCEAN BOTTOM NODE DATA USING COMPLEX WAVELET TRANSFORMS

RELATED APPLICATION

The present application is related to, and claims priority from U.S. Provisional Patent Application No. 61/751,565, filed Jan. 11, 2013, entitled "SHEAR NOISE ATTENUATION AND PZ MATCHING FOR OBN DATA WITH A NEW SCHEME OF COMPLEX WAVELET TRANSFORM," to Can Peng, Rongxin Huang and Biniam Asmerom, the disclosure of which is incorporated herein by reference.

TECHNICAL FIELD

Embodiments of the subject matter disclosed herein generally relate to methods and systems for seismic data processing and, more particularly, to mechanisms and techniques for two-dimensional complex wavelet transformations.

BACKGROUND

Seismic data acquisition and processing techniques are used to generate a profile (image) of a geophysical structure (subsurface) of the strata underlying the land surface or seafloor. Among other things, seismic data acquisition involves the generation of acoustic waves and the collection of reflected/refracted versions of those acoustic waves to generate the image. This image does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process in the field of seismic surveying.

Considering the characteristics of ocean-bottom-node (OBN) data processing, pressure data (P), recorded by hydrophones and vertical particle velocity data (Vz), recorded by geophones are jointly processed for the separation of upward traveling and downward traveling wave fields. Based on the fact that upward traveling waves in P data and Vz data have the same polarity and downward traveling waves in P data and Vz data have opposite polarity, as shown in the equations:

$$P=U+D \text{ and } Vz=(k_z/\rho\omega)(U-D) \quad (1)$$

and described by B. H. Hoffe, L. R. Lines and P. W. Cary in their 2000 article entitled "Applications of OBC Recording: The Leading Edge," published in The Leading Edge, 19, page 382 and incorporated herein by reference, the summation of the P data and the Vz data can separate the upward traveling waves from the downward traveling waves.

A complicating factor associated with the above described wavefield separation derives from the fact that the Vz data usually contains shear wave noise that does not exist in the P component of the wave data, as described by J. Paffenholz, P. Docherty, R. Shurtleff and D. Hays in their 2006 article entitled "Shear Wave Noise on OBS Vz Data—Part II Elastic Modeling of Scatterers in the Seabed," published in EAGE 68th Conference and Exhibition, B047 and incorporated herein by reference. Accordingly, the shear wave noise in the Vz component needs attenuated before the Vz wavelets and the P wavelets can be matched and summed.

Continuing with the wavefield separation, shear wave noise attenuation in Vz and matching between P and Vz can be achieved in one step with local attribute matching in a dual-tree complex wavelet transform (DTCWT) domain as described by Z. Yu, C. Kumar and I. Ahmed (hereinafter YU) in their 2011 article entitled "Ocean Bottom Seismic Noise Attenuation Using Local Attribute Matching Filter," published in SEG Technical Program, Expanded Abstracts, 30, pages 3586-3590 and incorporated herein by reference. A two-dimensional (2D) DTCWT is applied to both the P components and the Vz components to obtain two sets of complex coefficients as described by I. W. Selesnick, R. G. Baraniuk and N. G. Kingsbury (hereinafter SELESNICK) in their 2005 article entitled "The Dual-Tree Complex Wavelet Transform," published in IEEE Signal Processing Magazine, 22, pages 123-151 and incorporated herein by reference. The amplitude of each complex coefficient of a Vz wavelet is matched to the amplitude of a corresponding P wavelet while preserving the phase of the wavelets, leading to a suppression of the shear noise in the Vz data.

Looking to how 2D DTCWT is implemented in a row-column separable way, as described by SELESNICK, i.e., analyzing filters are applied in rows and columns separately in analysis stages, wherein each analysis stage is equivalent to dividing the input F-K domain into the four sub-bands of HH band (high-f, high-k), HL band (high-f, low-k), LH band (low-f, high-k) and LL band (low-f, low-k). Continuing, the next analysis stage is recursively performed only within the LL band. Accordingly, in conventional 2D DTCWT the division of the input F-K domain is similar to FIG. 3(a) and this division pattern has an intrinsic problem, i.e., high-k components have poor frequency resolution in the low frequencies.

Evaluating field seismic data indicates that shear wave noise in Vz usually exists in a large k range and in a low frequency range. Unfortunately, with the conventional 2D DTCWT band division, high-k shear noise cannot be adequately isolated in the frequency domain and therefore attenuation of high-k shear noise is inhibited. In another aspect, the drawbacks associated with the conventional 2D DTCWT are caused by the limit of angle resolving capability. In conventional 2D DTCWT, every stage has three wavelet bands, i.e, the LH band, the HH band and the HL band, and each band accommodates two 2D wavelet bases that are conjugate to each other. According to SELESNICK and YU, every stage accommodates exactly six orientations of the 2D wavelets. However, the limitation of six orientations restricts the angular resolving capability of the conventional 2D DTCWT, i.e., for high-f or high-k bands in the early analysis stages, the wavelet bases are sharp and should have a detailed angular resolving capability to resolve more than six orientations.

Accordingly, it would be desirable to provide systems and methods that avoid the afore-described problems and drawbacks.

SUMMARY

According to an embodiment, a method, stored in a memory and executing on a processor, for shear noise attenuation of seismic data in a High Angular Resolution Complex Wavelet Transformation (HARCWT) domain comprises computing a number of wavelet orientations for each stage of said HARCWT; performing a wavelet analysis in each frequency sub-band for all wave numbers and for all frequency sub-bands in each wave number; matching a vertical particle velocity data component to a pressure data component, based on said wavelet analysis, to suppress shear noise; and outputting shear noise suppressed seismic data based on said matching.

According to another embodiment, a node for shear noise attenuation in a High Angular Resolution Complex Wavelet domain comprises one or more processors configured to execute computer instructions and a memory configured to store said computer instructions wherein said computer instructions further comprise: a wavelet orientation component for computing the number of wavelet orientations for each stage; a wavelet analysis component for removing said shear noise from associated seismic data; a matching component for matching a vertical particle velocity data component of said seismic data to a pressure data component of said seismic data; and an output component for outputting noise suppressed seismic data.

According to another embodiment, a method, stored in a memory and executing on a processor, for shear noise attenuation of seismic data, includes computing a number of wavelet orientations for each stage of a transform, performing a wavelet analysis for each of the wavelet orientations, matching a vertical particle velocity data component to a pressure data component, based on said wavelet analysis, to suppress shear noise, and outputting shear noise suppressed seismic data.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 4a-e show various aspects of shot gather and P/Vz matching;

FIG. 5 is a flowchart depicting a method of shear noise suppression according to an embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of two-dimensional complex wavelet transformations based on adaptive angular-resolving capability for each analysis stage. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments described herein, methods and systems for two-dimensional complex wavelet transformations are presented which, for example, provide adaptive angular-resolving capability for each analysis stage. Such methods and systems can, for example, be used to allow for high-k shear noise suppression during two-dimensional (2D) dual-tree complex wavelet transformation (DTCWT).

Figure 1:
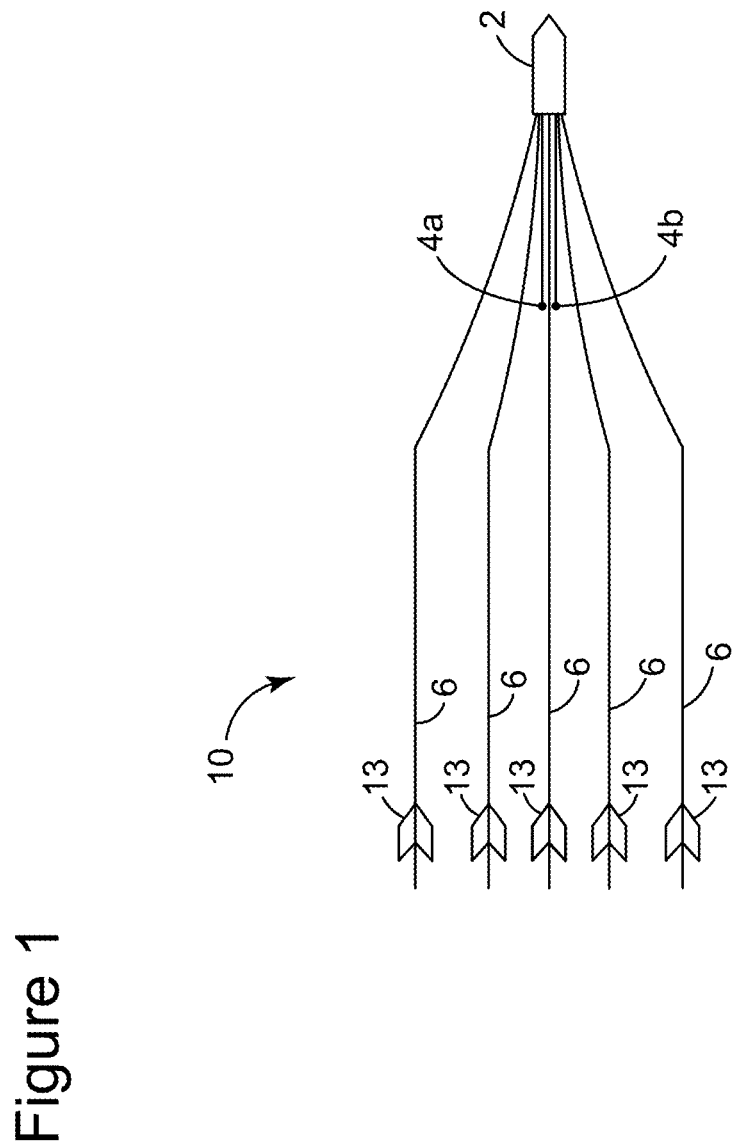
FIGS. 1 and 2 show various aspects of an exemplary marine seismic survey system in which various shear noise suppression embodiments can be implemented.

In order to provide some context for the subsequent exemplary embodiments related to 2D DTCWT, consider first a seismic data acquisition process and system as will now be described with respect to FIGS. 1 and 2. In FIG. 1, a data acquisition system 10 includes a ship 2 towing plural streamers 6 that may extend over kilometers behind ship 2. Each of the streamers 6 can include one or more birds 13 that maintains streamer 6 in a known fixed position relative to other streamers 6, and the birds 13 are capable of moving streamer 6 as desired according to bi-directional communications birds 13 can receive from ship 2. One or more source arrays 4a,b may be also towed by ship 2 or another ship for generating seismic waves. Source arrays 4a,b can be placed either in front of or behind receivers 14, or both behind and in front of receivers 14. The seismic waves generated by source arrays 4a,b propagate downward, reflect off of, and penetrate the seafloor, wherein the refracted waves eventually are reflected by one or more reflecting structures (not shown in FIG. 1) back to the surface (see FIG. 2, discussed below). The reflected seismic waves propagate upwardly and are detected by receivers 14 provided on streamers 6. The seismic waves then reflect off of the free surface, i.e., the surface of the body of water (see FIG. 2, discussed below), traveling downward and are once again detected by receivers 14 provided on streamers 6 as receiver ghosts. This process is generally referred to as "shooting" a particular seafloor area, with the seafloor area referred to as a "cell" and the sea surface referred to as a "free surface."

Figure 2:
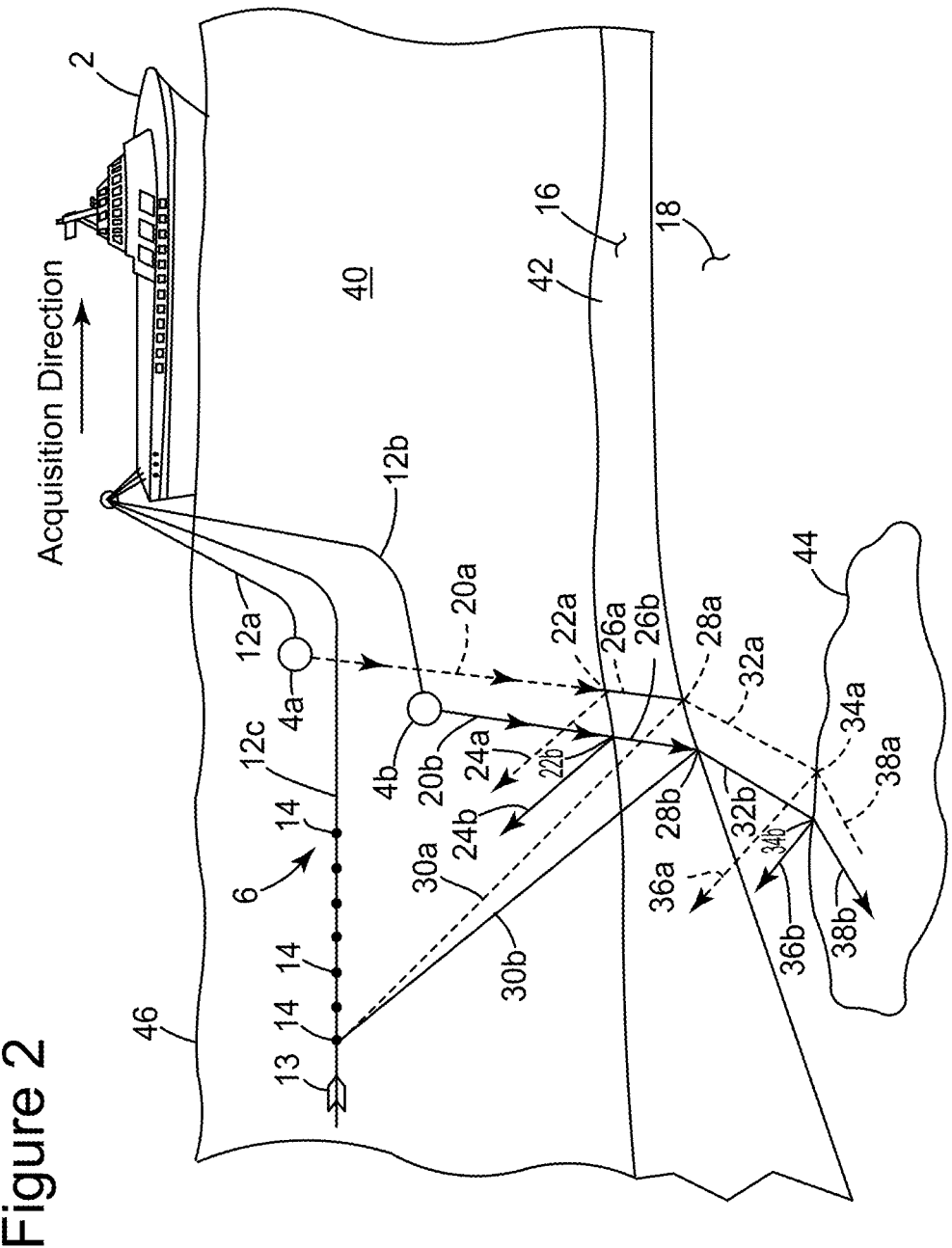

FIG. 2 illustrates a side view of the data acquisition system 10 of FIG. 1. Ship 2, located on ocean surface 46, tows one or more streamers 6, that is comprised of cables 12, and a plurality of receivers 14. Shown in FIG. 2 are two source streamers, which include sources 4a,b attached to respective cables 12a,b. Each source 4a,b is capable of transmitting a respective sound wave, or transmitted signal 20a,b. For the sake of simplifying the drawings, but while not detracting at all from an understanding of the many principles involved, only a first transmitted signal 20a will be shown (even though some or all of sources 4 can be simultaneously (or not) transmitting similar transmitted signals 20). First transmitted signal 20a travels through ocean 40 and arrives at first refraction/reflection point 22a. First reflected signal 24a from first transmitted signal 20a travels upward from ocean floor 42, back to receivers 14. As those of skill in the art can appreciate, whenever a signal—optical or acoustical—travels from one medium with a first index of refraction $n_1$ and meets with a different medium, with a second index of refraction $n_2$, a portion of the transmitted signal is reflected at an angle equal to the incident angle (according to the well-known Snell's law), and a second portion of the transmitted signal can be refracted (again according to Snell's law).

Thus, as shown in FIG. 2, first transmitted signal 20a generates first reflected signal 24a, and first refracted signal 26a. First refracted signal 26a travels through sediment layer 16 (which can be generically referred to as first subsurface layer 16) beneath ocean floor 42, and can now be considered to be a "new" transmitted signal, such that when it encounters a second medium at second refraction/reflection point 28a, a second set of refracted and reflected signals 32a and 30a, are subsequently generated. Further, as shown in FIG. 2, there happens to be a significant hydrocarbon deposit 44 within a third medium, or solid earth/rock layer 18 (which can be generically referred to as second subsurface layer 18). Consequently, refracted and reflected signals are generated by the hydrocarbon deposit, and it is the purpose of data acquisition system 10 to generate data that can be used to discover such hydrocarbon deposits 44.

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples. A surface multiple signal 50a shown in FIG. 2 is one such example of a multiple, however there are other ways for multiples to be generated. For example, reflections form the surface can travel back down to the receivers and be recorded as ghosts. Multiples do not add any useful information about the geology beneath the ocean floor, and thus they are, in essence, noise, and it is desirable to eliminate them and/or substantially reduce and/or eliminate their influence in signal processing of the other reflected signals so as to correctly ascertain the presence (or the absence) of underground/underwater hydrocarbon deposits. Similarly ghosts, i.e., reflections of primary waves or multiples from the surface of the water which are again recorded by receivers 14, should also be suppressed or removed.

The data collected and recorded by receivers 14 of FIG. 2 can be processed to, among other things, compute 2D complex wavelet transformations providing adaptive angular-resolving capability for each analysis stage. In an embodiment, a 2D complex wavelet transform is performed which provides an improved angular resolution. The embodiment improves the greater resolution based on the analysis stages performing wavelet analysis in frequency sub-bands for all k in the LL band, the LH band, the HH band and the HL band.

Figure 3A:
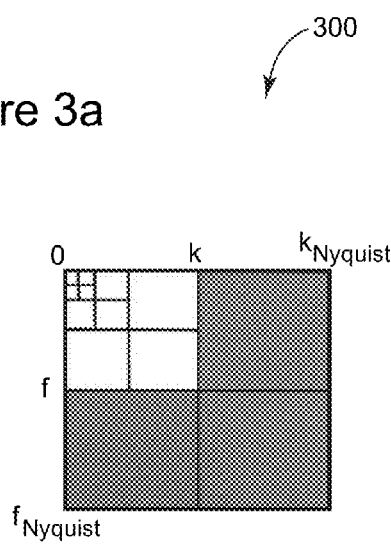
FIGS. 3a-d show various aspects of stage analysis associated with the embodiments.
Figure 3B:
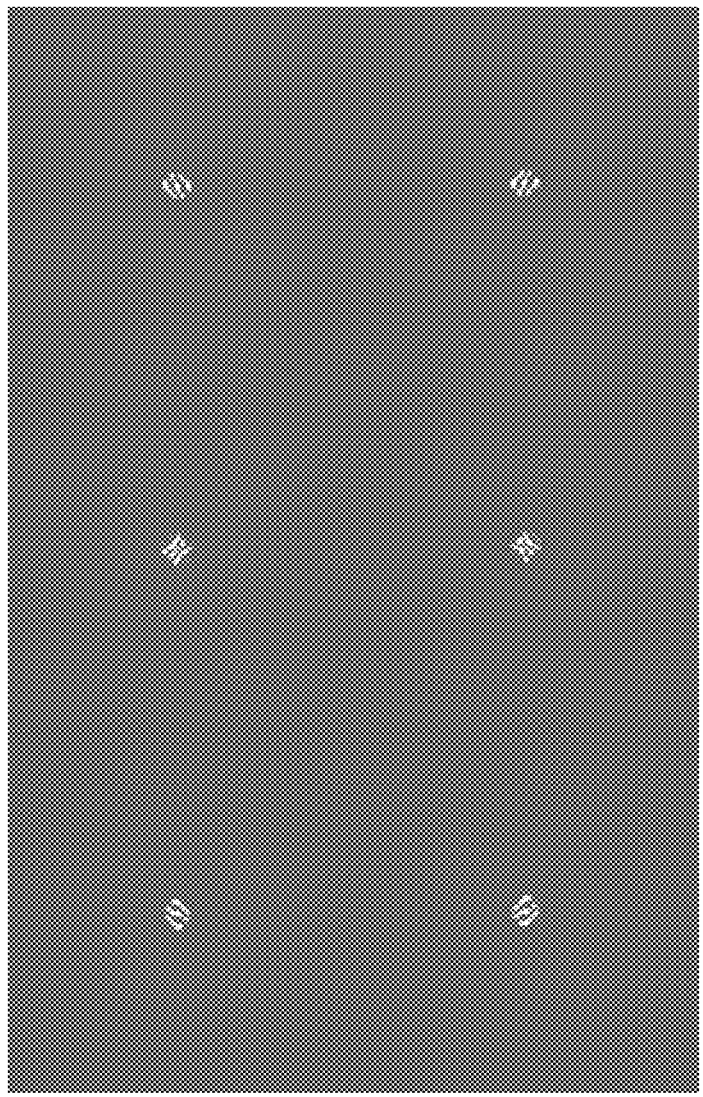

To provide a context for the embodiment description and an understanding of how a greater resolution is accomplished, a description of a 2D DTCWT implementation presents every stage accommodating exactly six orientations of the 2D wavelet bases, regardless of the real angular resolution the implementation can achieve. The six 2D wavelet bases for a stage "i" can be expressed as follows:

$$\Psi_{i,1}(x, y) = \frac{1}{\sqrt{2}}(\phi_i^h(x)\psi_i^h(y) - \phi_i^g(x)\psi_i^g(y)), \qquad (2)$$

$$\Psi_{i,2}(x, y) = \frac{1}{\sqrt{2}}(\psi_i^h(x)\psi_i^h(y) - \psi_i^g(x)\psi_i^g(y))$$

$$\Psi_{i,3}(x, y) = \frac{1}{\sqrt{2}}(\psi_i^h(x)\phi_i^h(y) - \psi_i^g(x)\phi_i^g(y)), \qquad (3)$$

$$\Psi_{i,4}(x, y) = \frac{1}{\sqrt{2}}(\phi_i^h(x)\psi_i^h(y) + \phi_i^g(x)\psi_i^g(y))$$

$$\Psi_{i,5}(x, y) = \frac{1}{\sqrt{2}}(\psi_i^h(x)\psi_i^h(y) + \psi_i^g(x)\psi_i^g(y)), \qquad (4)$$

$$\Psi_{i,6}(x, y) = \frac{1}{\sqrt{2}}(\psi_i^h(x)\phi_i^h(y) + \psi_i^g(x)\phi_i^g(y))$$

where $\Psi^h$ and $\Psi^g$ are the two wavelet functions for the i-th stage, which are Hilbert transforms to each other and $\Phi^h$ and $\Phi^g$ are the two scaling functions for the i-th stage, also Hilbert transforms to each other. Depicted in FIG. 3(b) are six wavelet bases of the first stage of a four-stage 2D DTCWT for a 128-by-128 sample input.

Figure 3C:
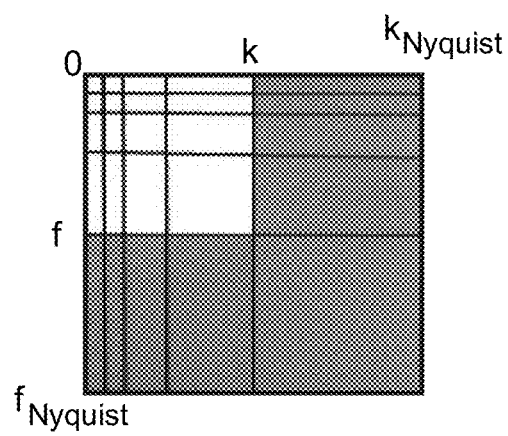

An embodiment for High Angular Resolution Complex Wavelet Transform (HARCWT) provides better angular resolution than 2D DTCWT based on performing wavelet analysis in frequency sub-bands for all k in the LL band, the LH band, the HH band and the HL band. Looking to FIG. 3(c), a band division of HARCWT is depicted wherein it is apparent from the band division that all k components have equal resolution in the frequency and vice versa.

Continuing with a HARCWT embodiment, different stages accommodate different numbers of 2D wavelet orientations, i.e., the i-th stage accommodates 2(2n+3−2i) orientations, where n is the total number of stages of the transform, resulting in early stages having more angular resolution. Accordingly, the early-stage 2D wavelet bases are sharp since they have either higher "f" or higher "k" than later stages. The expressions of the 2(2n+3−2i) wavelet functions for stage "i" of an n-stage HARCWT are given as:

$$\Psi_{i,1}(x, y) = \frac{1}{\sqrt{2}}(\phi_n^h(x)\psi_i^h(y) - \phi_n^g(x)\psi_i^g(y))$$

$$\Psi_{i,j}(x, y) = \frac{1}{\sqrt{2}}(\psi_{n+2-j}^h(x)\psi_i^h(y) - \psi_{n+2-j}^g(x)\psi_i^g(y)),$$

$$j = 2, 3, \ldots, n+2-i$$

$$\Psi_{i,j}(x, y) = \frac{1}{\sqrt{2}}(\psi_i^h(x)\psi_{j+2i-n-2}^h(y) - \psi_i^g(x)\psi_{j+2i-n-2}^g(y)),$$

$$j = n+3-i, n+4-i, \ldots, 2n+2-2i$$

$$\Psi_{i,2n+3-2i}(x, y) = \frac{1}{\sqrt{2}}(\psi_i^h(x)\phi_n^h(y) - \psi_i^g(x)\phi_n^g(y))$$

$$\Psi_{i,2n+4-2i}(x, y) = \frac{1}{\sqrt{2}}(\phi_n^h(x)\psi_i^h(y) + \phi_n^g(x)\psi_i^g(y))$$

$$\Psi_{i,j+2n+3-2i}(x, y) = \frac{1}{\sqrt{2}}(\psi_{n+2-j}^h(x)\psi_i^h(y) + \psi_{n+2-j}^g(x)\psi_i^g(y)),$$

$$j = 2, 3, \ldots, n+2-i$$

$$\Psi_{i,j+2n+3-2i}(x, y) = \frac{1}{\sqrt{2}}(\psi_i^h(x)\psi_{j+2i-n-2}^h(y) + \psi_i^g(x)\psi_{j+2i-n-2}^g(y)),$$

$$j = n+3-i, n+4-i, \ldots, 2n+2-2i$$

$$\Psi_{i,2(2n+3-2i)}(x, y) = \frac{1}{\sqrt{2}}(\psi_i^h(x)\phi_n^h(y) + \psi_i^g(x)\phi_n^g(y))$$

Figure 3D:
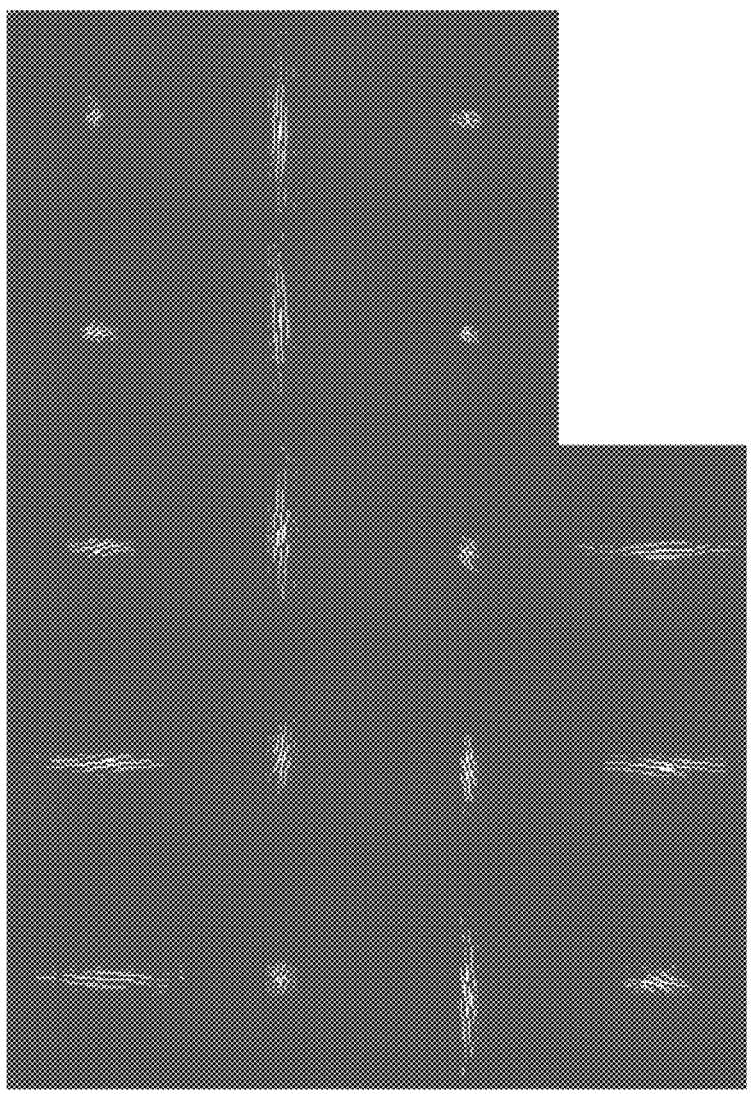

Equations (5)-(12) sequentially, where $\Psi^h$ and $\Psi^g$ are the two wavelet functions for the i-th stage, which are Hilbert transforms to each other and $\Phi^h$ and $\Phi^g$ are the two scaling functions for the i-th stage, also Hilbert transforms to each other. Depicted in FIG. 3(d) of the embodiment are eighteen wavelet bases of the first stage of a four-stage HARCWT for a 128-by-128 sample input. It should be noted in the embodiment that the wavelet type used in the transform is the same type used by D. B. H. Tay and N. G. Kingsbury in their 1993 article entitled "Flexible Design of Multidimensional Perfect Reconstruction FIR 2-Band Filters Using Transformation of Variables," published in IEEE Transaction and Image Processing, 2, pages 466-480 and incorporated herein by reference. It should be noted in the embodiment that the advantages of HARCWT provide that high-k shear noise can be better isolated and correspondingly better suppressed in the HARCWT domain than in a 2D DTCWT domain.

Looking now to FIG. 4, depicted is a test of PZ matching for a real-data common node gather. The input pressure record of the node gather is depicted in FIG. 4($a$) and the Vz component of the node gather is depicted in FIG. 4($b$). It should be noted in the embodiment that the Vz component of this gather has shear noise with high-k in the deep section. Looking to FIG. 4($c$), the result of matching the Vz component to the input P component using a 2D DTCWT approach is depicted and obvious residual high-k shear noise is present. Looking now to FIG. 4($d$), an embodiment result using the HARCWT method is depicted and a comparison of FIG. 4($c$) to FIG. 4($d$) shows the clear attenuation of the high-k shear noise by the HARCWT embodiment and looking to FIG. 4($e$), the difference between the matching result with 2D DTCWT and HARCWT is depicted.

Continuing with the real-data example, the HARCWT result has more angular resolution capability, especially for high-k and high-f segments than does the 2D DTCWT. Further, the energy of high-k shear noise in Vz data can be better separated in certain f-k bands in the HARCWT domain than in the 2D DTCWT domain, resulting in a greater contrast between the noise contaminated f-k band of the Vz data and the noise free f-k band of the P data. In general, better focusing and larger energy contrasts between the complex wavelet coefficients in the P data and the Vz data lead to more effective noise energy suppression and better signal preservation with the embodiment HARCWT method.

Looking now to FIG. 5, a method embodiment of a noise suppression technique 500 is depicted. Beginning at step 502 of the method embodiment, a number of wavelet orientations is computed for each stage of the high angular resolution complex wavelet transform (HARCWT). It should be noted in the embodiment that the number of wavelet orientations are highest in the earlier stages and decrease in subsequent stages of the computation.

Next, at step 504 of the method embodiment, a wavelet analysis is performed. It should be noted in the method embodiment that the wavelet analysis is performed in each frequency sub-band for wavenumber members of the frequency sub-band and for all frequency sub-bands associated with each wavenumber.

Continuing at step 506 of the method embodiment, a Vz data component is matched to a P data component, based on the previous wavelet analysis, to suppress the shear. Next at step 508 of the method embodiment, the shear noise suppressed seismic data is output for further processing.

Figure 6:
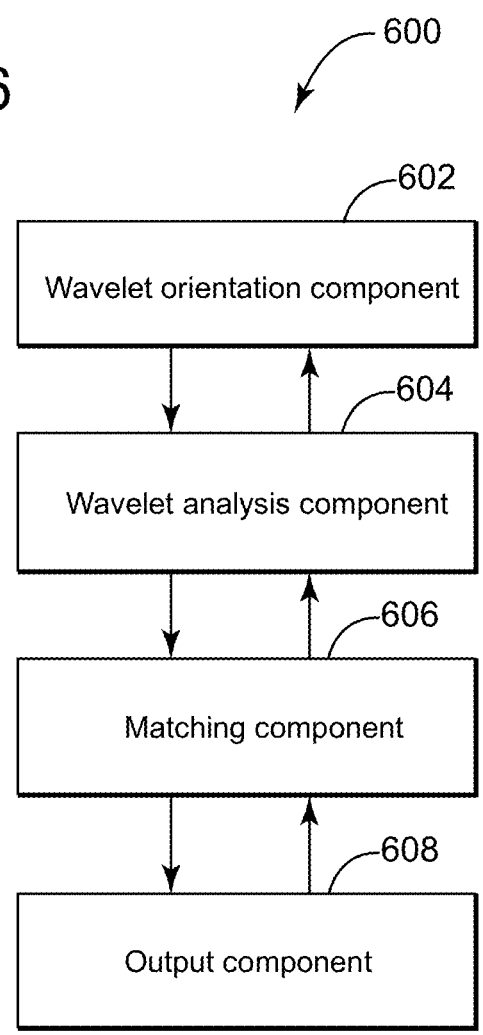
FIGS. 6-7 shows various aspects of software components or modules which can be used to implement the embodiments.

As will be appreciated from the foregoing discussion, methods for shear noise suppression of seismic data according to these embodiments may, at least in part, be implemented in software operating on a suitably programmed computing device. An exemplary implementation, with suitable software modules or components, will now be described with respect to FIGS. 6-7. Looking now to FIG. 6, an embodiment shear noise suppression node 600 comprises a wavelet orientation component 602, a wavelet analysis component 604, a matching component 606 and an output component 608. The wavelet orientation component 602 provides the capability to compute the number of wavelet orientations for each predetermined stage of the wavelet analysis. In another aspect of the embodiment, the number of wavelet orientations decreases with each successive stage.

Continuing with the embodiment, the wavelet analysis component 604 provides the capability to solve the wavelet functions associated with a HARCWT analysis. It should be noted in the embodiment that the wavelet equations are solved in all frequency sub-bands for all wavenumbers and vice versa. Next in the embodiment, the matching component 606 provides the capability to match the vertical particle velocity data component with the pressure data component generate the shear noise suppressed seismic data. Continuing with the embodiment, the output component 608 provides the capability to output the shear noise suppressed seismic data. It should be noted in the exemplary embodiment that the shear noise suppressed seismic data can be further processed.

Figure 7:
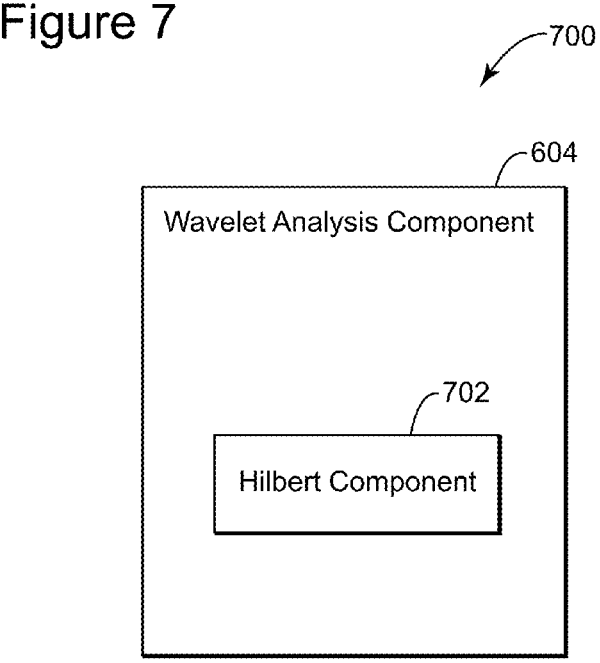

Looking now to FIG. 7, a wavelet analysis component 604 of an embodiment shear noise suppression node 600 further comprises a Hilbert component 702. The fast Hilbert component implements a Hilbert Transform (HT) to compute a transform in the same domain. It should be noted in the embodiment that the Hilbert component operates on both the wavelet functions and the scaling functions.

Figure 8:
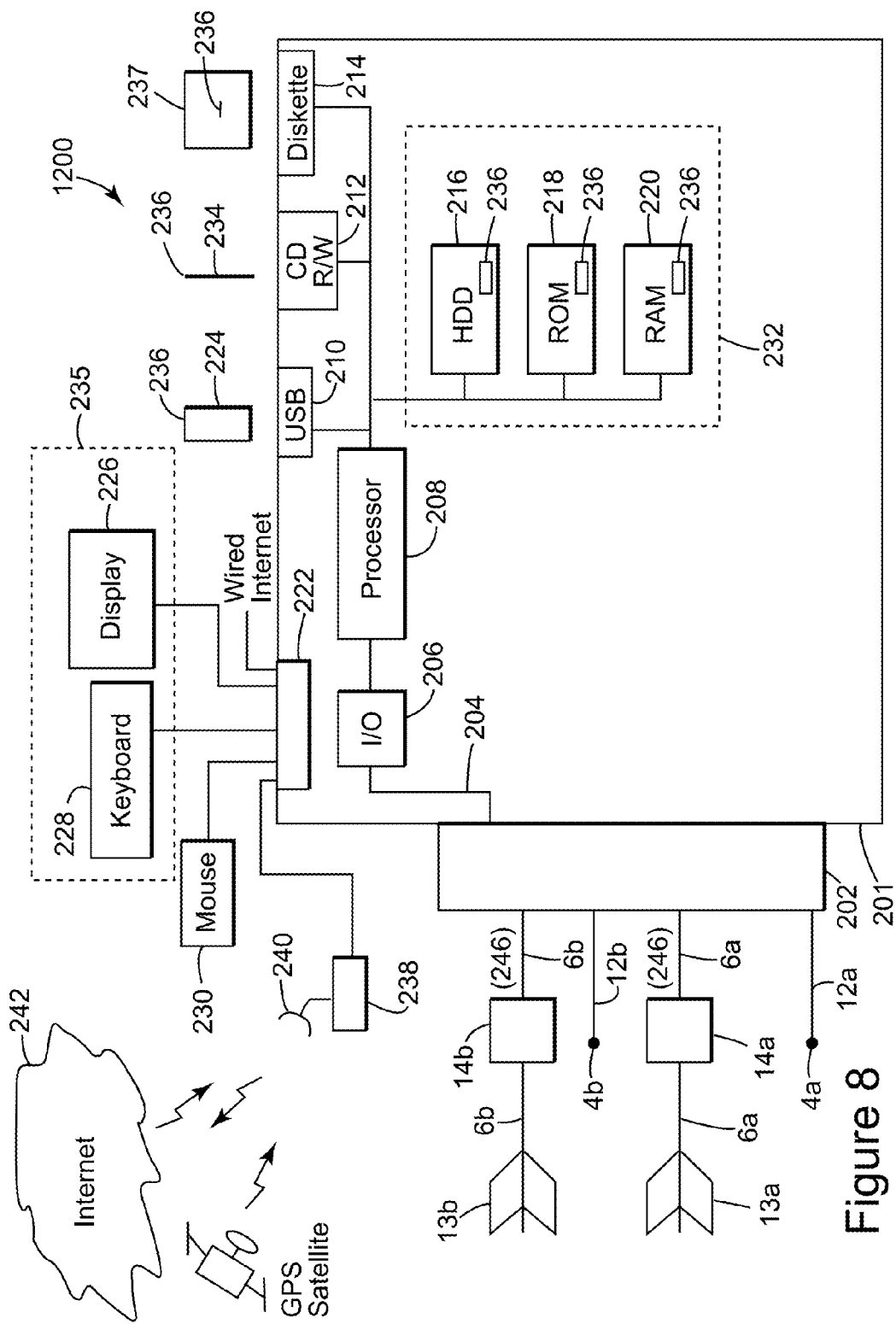
FIG. 8 illustrates an exemplary data processing device or system which can be used to implement the embodiments.

The computing device(s) or other network nodes involved in shear noise suppression as set forth in the above described embodiments may be any type of computing device capable of processing and communicating seismic data associated with a seismic survey. An example of a representative computing system capable of carrying out operations in accordance with these embodiments is illustrated in FIG. 8. System 1200 includes, among other items, server 201, source/receiver interface 1202, internal data/communications bus (bus) 204, processor(s) 208 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 210, compact disk (CD)/digital video disk (DVD) read/write (R/W) drive 212, floppy diskette drive 214 (though less used currently, many servers still include this device), and data storage unit 232.

Data storage unit 232 itself can comprise hard disk drive (HDD) 216 (these can include conventional magnetic storage media, but, as is becoming increasingly more prevalent, can include flash drive-type mass storage devices 224, among other types), ROM device(s) 218 (these can include electrically erasable (EE) programmable ROM (EEPROM) devices, ultra-violet erasable PROM devices (UVPROMs), among other types), and random access memory (RAM) devices 220. Usable with USB port 210 is flash drive device 224, and usable with CD/DVD R/W device 212 are CD/DVD disks 234 (which can be both read and write-able). Usable with diskette drive device 214 are floppy diskettes 237. Each of the memory storage devices, or the memory storage media (216, 218, 220, 224, 234, and 237, among other types), can contain parts or components, or in its entirety, executable software programming code (software) 236 that can implement part or all of the portions of the method described herein. Further, processor 208 itself can contain one or different types of memory storage devices (most probably, but not in a limiting manner, RAM memory storage media 220) that can store all or some of the components of software 236.

In addition to the above described components, system 200 also comprises user console 234, which can include keyboard 228, display 226, and mouse 230. All of these components are known to those of ordinary skill in the art, and this description includes all known and future variants of these types of devices. Display 226 can be any type of known display or presentation screen, such as liquid crystal displays (LCDs), light emitting diode displays (LEDs), plasma displays, cathode ray tubes (CRTs), among others. User console 235 can include one or more user interface mechanisms such as a mouse, keyboard, microphone, touch pad, touch screen, voice-recognition system, among other inter-active inter-communicative devices.

User console 234, and its components if separately provided, interface with server 201 via server input/output (I/O) interface 222, which can be an RS232, Ethernet, USB or other type of communications port, or can include all or some of these, and further includes any other type of communications means, presently known or further developed. System 200 can further include communications satellite/global positioning system (GPS) transceiver device 238, to which is electrically connected at least one antenna 240 (according to an exemplary embodiment, there would be at least one GPS receive-only antenna, and at least one separate satellite bi-directional communications antenna). System 200 can access internet 242, either through a hard wired connection, via I/O interface 222 directly, or wirelessly via antenna 240, and transceiver 238.

Server 201 can be coupled to other computing devices, such as those that operate or control the equipment of ship 2, via one or more networks. Server 201 may be part of a larger network configuration as in a global area network (GAN) (e.g., internet 242), which ultimately allows connection to various landlines.

According to a further exemplary embodiment, system 200, being designed for use in seismic exploration, will interface with one or more sources 4*a,b* and one or more receivers 14. These, as previously described, are attached to streamers 6*a,b*, to which are also attached birds 13*a,b* that are useful to maintain positioning. As further previously discussed, sources 4 and receivers 14 can communicate with server 201 either through an electrical cable that is part of streamer 6, or via a wireless system that can communicate via antenna 240 and transceiver 238 (collectively described as communications conduit 246).

According to further exemplary embodiments, user console 235 provides a means for personnel to enter commands and configuration into system 200 (e.g., via a keyboard, buttons, switches, touch screen and/or joy stick). Display device 226 can be used to show: streamer 6 position; visual representations of acquired data; source 4 and receiver 14 status information; survey information; and other information important to the seismic data acquisition process. Source and receiver interface unit 202 can receive the hydrophone seismic data from receiver 14 though streamer communication conduit 248 (discussed above) that can be part of streamer 6, as well as streamer 6 position information from birds 13; the link is bi-directional so that commands can also be sent to birds 13 to maintain proper streamer positioning. Source and receiver interface unit 202 can also communicate bi-directionally with sources 4 through the streamer communication conduit 248 that can be part of streamer 6. Excitation signals, control signals, output signals and status information related to source 4 can be exchanged by streamer communication conduit 248 between system 200 and source 4.

Bus 204 allows a data pathway for items such as: the transfer and storage of data that originate from either the source sensors or streamer receivers; for processor 208 to access stored data contained in data storage unit memory 232; for processor 208 to send information for visual display to display 226; or for the user to send commands to system operating programs/software 236 that might reside in either the processor 208 or the source and receiver interface unit 202.

System 200 can be used to implement the methods described above associated with shear noise suppression according to an exemplary embodiment. Hardware, firmware, software or a combination thereof may be used to perform the various steps and operations described herein. According to an exemplary embodiment, software 236 for carrying out the above discussed steps can be stored and distributed on multi-media storage devices such as devices 216, 218, 220, 224, 234, and/or 237 (described above) or other form of media capable of portably storing information (e.g., universal serial bus (USB) flash drive 426). These storage media may be inserted into, and read by, devices such as the CD-ROM drive 414, the disk drive 412, among other types of software storage devices.

It should be noted in the embodiments described herein that these techniques can be applied in either an "offline", e.g., at a land-based data processing center or an "online" manner, i.e., in near real time while onboard the seismic vessel. For example, shear noise suppression can occur as the seismic data is recorded onboard the seismic vessel. In this case, it is possible for shear noise suppressed data to be generated as a measure of the quality of the sampling run.

The disclosed exemplary embodiments provide a server node, and a method for shear noise suppression associated with seismic data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for shear noise attenuation of seismic data using a High Angular Resolution Complex Wavelet Transformation (HARCWT), said method comprising:
    acquiring the seismic data representative of a response of an underground explored formation to a seismic excitation;
    computing a number of wavelet orientations for each stage of said HARCWT, wherein different stages of said HARCWT have different number of wavelet orientations;
    performing a wavelet analysis of vertical particle velocity data and pressure data in each frequency sub-band for all wave numbers and all frequency sub-bands in each wave number of the wavelet orientations to determine respective components;
    matching a vertical particle velocity data component to a pressure data component, based on said wavelet analysis, to suppress shear noise;
    outputting shear noise suppressed seismic data based on said matching; and
    generating an image of the underground formation using the shear noise suppressed seismic data.

2. The method of claim 1, wherein said number of wavelet orientations are computed from the relationship $2(2n+3-2i)$ where n is the total number of stages for said HARCWT and i is the stage number.

3. The method of claim 2, wherein said total number of stages is four.

4. The method of claim 1, wherein said wavelet analysis comprises two wavelet functions for each stage.

5. The method of claim 4, wherein said wavelet functions are Hilbert transforms to each other.

6. The method of claim 1, wherein said wavelet analysis comprises two scaling functions for each stage.

7. The method of claim 6, wherein said scaling functions are Hilbert transforms to each other.

8. The method of claim 1, wherein successive stages have fewer wavelet orientations than earlier stages.

9. A node for shear noise attenuation using a High Angular Resolution Complex Wavelet Transform (HARCWT), said node comprising:
    one or more processors connected and configured to obtain seismic data representative of a response of an underground explored formation to a seismic excitation, and configured to execute computer instructions and a memory configured to store said computer instructions wherein said computer instructions comprise:
        a wavelet orientation component for computing a number of wavelet orientations for each stage in the HARCWT, wherein different stages of said HARCWT have different number of wavelet orientations;
        a wavelet analysis component for performing a wavelet analysis of vertical particle velocity data and pressure data in each frequency sub-band for all wave numbers and all frequency sub-bands in each wave number of the wavelet orientations to determine respective components;
        a matching component for matching a vertical particle velocity data component of said seismic data to a pressure data component of said seismic data using the wavelet analysis; and
        an output component for outputting noise suppressed seismic data based on the matching; and
    a display configured to display an image of the underground explored formation generated by the one or more processors using the shear noise suppressed seismic data.

10. The node of claim 9, wherein said wavelet analysis component further comprises a Hilbert component for transforming wavelet functions.

11. The node of claim 10, wherein said Hilbert component further comprises the capability for transforming scaling functions.

12. The node of claim 9, wherein said number of wavelet orientations are computed from the relationship $2(2n+3-2i)$ where n is the total number of stages for said HARCWT and i is the stage number.

13. The node of claim 12, wherein said total number of stages is four.

14. The node of claim 9, wherein said wavelet analysis comprises two wavelet functions for each stage.

15. The node of claim 14, wherein said wavelet functions are Hilbert transforms to each other.

16. The node of claim 9, wherein said wavelet analysis comprises two scaling functions for each stage.

17. The node of claim 9, wherein successive stages have fewer wavelet orientations than earlier stages.

18. A seismic survey system comprising:
    a seismic data acquisition system configured to acquire seismic data representative of a response of an underground explored formation to a seismic excitation;
    a seismic data processing system including one or more processors configured to execute computer instructions and a memory configured to store said computer instructions which, when executed by the one or more processors make them:
        to compute a number of wavelet orientations for each stage of said HARCWT, wherein different stages of said HARCWT have different number of wavelet orientations,
        to perform a wavelet analysis of vertical particle velocity data and pressure data in each frequency sub-band for all wave numbers and all frequency sub-bands in each wave number of the wavelet orientations to determine respective components,
        to match a vertical particle velocity data component to a pressure data component, based on said wavelet analysis, to suppress shear noise,
        to output shear noise suppressed seismic data based on said matching, and
        to generate an image of the underground explored formation generated using the shear noise suppressed seismic data; and
    a display configured to display the image of the underground explored formation.

19. The system of claim 18, wherein said number of wavelet orientations are computed from the relationship $2(2n+3-2i)$ where n is the total number of stages for said HARCWT and i is the stage number.

20. The system of claim 18, wherein successive stages have fewer wavelet orientations than earlier stages.

* * * * *